(12) United States Patent
Hester

(10) Patent No.: US 7,058,297 B1
(45) Date of Patent: Jun. 6, 2006

(54) DISTRIBUTED PROCESSOR MODULES AND PERSISTENT STORAGE IN AN OPTICAL NETWORK

(75) Inventor: Stewart K. Hester, Belmont, CA (US)

(73) Assignee: CIENA Corporation, Linthicum, MD (US)

( * ) Notice: Subject to any disclaimer, the term of this patent is extended or adjusted under 35 U.S.C. 154(b) by 787 days.

(21) Appl. No.: 09/965,107

(22) Filed: Sep. 25, 2001

(51) Int. Cl.
H04B 10/08 (2006.01)

(52) U.S. Cl. .................................. 398/17; 713/193

(58) Field of Classification Search ............... 398/79, 398/17; 713/193; 359/118
See application file for complete search history.

(56) References Cited

U.S. PATENT DOCUMENTS

| 6,084,694 | A |   | 7/2000 | Milton et al. ............ 359/124 |
| 6,160,651 | A | * | 12/2000 | Chang et al. ............ 398/79 |
| 2002/0109879 | A1 | * | 8/2002 | Wing So .................. 359/118 |
| 2003/0037247 | A1 | * | 2/2003 | Obara et al. ............. 713/193 |

OTHER PUBLICATIONS

Hill, G. R. et al., "A Transport Network Layer Based On Optical Network Elements," Journal of Lightwave Technology, vol. 11, No. 5/6, May/Jun. 1993, pp. 667-679.
Ken-ichi Kitayama, "Subcarrier Multiplexing Based Signaling and Access Control in Optical FDM Networks," GLOBECOM '95: Communications for Global Harmony, Nov. 1995, vol. 3, pp. 1996-2002.

* cited by examiner

Primary Examiner—David C. Payne
(74) Attorney, Agent, or Firm—Dougherty Clements; Christopher L. Bernard; Tyler S. Brown

(57) ABSTRACT

In an optical network having a plurality of nodes, administrative information for one node is persistently stored at another node in the network. The network includes a first node having persistent storage memory for storing administrative information from a second node. The nodes communicate the administrative information over an optical signaling channel that travels on a path including one or more optical transmission media between the nodes.

Also described is an optical network having a plurality of nodes in which an administrative node processor module at a first node performs administrative control functions for a second node. Also described is a signaling channel module in each node that controls the communication or transfer of administrative information over the optical signaling channel.

43 Claims, 10 Drawing Sheets

DISTRIBUTED PROCESSOR MODULES AND PERSISTENT STORAGE IN AN OPTICAL NETWORK

FIELD OF INVENTION

The present invention relates generally to communication systems and more particularly, to a method and system for distributed storage of administrative information in a communications network. The present invention also generally relates to a system and method for distributed administrative control of one or more elements in one node by another node. An example of a communications network is a fiber optic communication system.

BACKGROUND

Nodes in a communications network such as an optical network may typically comprise an administrative node processor module (ANPM) and a persistent storage module (PSM). The processor module comprises a processor and a primary database. The administrative node processor module is concerned with control of administrative functions, examples of which include configuring and monitoring elements of a node and providing a management interface to a user.

The persistent storage module (PSM) typically comprises a memory access unit, for example a file server, and maintains a backup database of administrative information for the node. Persistence means that the stored information has to continue to exist even after one or more applications that saved and manipulated the data have ceased to run. Examples of administrative information are the default states and/or current states of the elements or components of the node. Examples of information stored would be power settings, and states of switches and indicators.

According to one method of providing fault tolerance in telecommunications systems, a database manager of the administrative node processor module transfers information to the persistent storage module to maintain a mirrored copy of its database. For example, if the processor module fails, upon replacement, the new processor module will query the persistent storage module and reconstruct a mirrored copy of the database thereby allowing hotswapping of the processor module.

While this mirroring technique is a standard solution for fault tolerance in telecommunications systems, it is generally desirable to decrease the costs of a system by requiring less hardware.

Therefore, in a network, it would be desirable if every node did not require its own persistent storage module. It would also be desirable if every node did not require its own administrative node processor module, which would further reduce hardware costs.

SUMMARY

The present invention provides various embodiments for overcoming the limitations of the prior art.

One embodiment provides for persistent storage of administrative information for one node at another node in an optical communications network. In this embodiment, an optical communications network having a plurality of nodes comprises a first node including a first administrative node processor module for performing administrative functions, and a persistent storage module for storing administrative information. The system further comprises a second node including a second administrative node processor module for performing administrative functions. An optical signaling channel travels on a path including one or more optical transmission media between the nodes.

The optical signaling channel carries administrative information from the second node to the first node for storage in the persistent storage module located in the first node. Each of the first and second nodes further comprises a signaling channel module. Each signaling channel module controls the communication or transfer of administrative information over the optical signaling channel at its node. The signaling channel module of the first node is communicatively coupled to the administrative node processor module in the first node and to the signaling channel module of the second node. The signaling channel module of the second node is communicatively coupled to the administrative node processor module of the second node and to the signaling channel module of the first node.

In another embodiment, an administrative node processor module at a first node performs administrative functions for a second node. In this other embodiment, an optical communications network having a plurality of nodes comprises a first node including an administrative node processor module for performing administrative functions for the first node and a second node. The optical signaling channel communicatively coupling the nodes is used in this embodiment for the transfer of administrative information. Each of the first node and the second node further comprises a signaling channel module for controlling communication of administrative information at its node over the optical signaling channel. The signaling channel module of the first node is communicatively coupled to the administrative node processor module and to the signaling channel module of the second node. The signaling channel module of the second node transfers administrative information received from the first node to a node element module within the second node.

DETAILED DESCRIPTION

Optical networks comprise those whose nodes process one or more optical wavelengths. An example of an optical network is a wavelength division multiplexed (WDM) optical network in which a plurality of wavelength channels are carried along an optical transmission medium. Each wavelength channel may carry other channels, each embodied as one or more time divisions of a time division multiplexed signal or one or more frequency divisions of a frequency division multiplexed signal. An example of an optical transmission medium is an optical fiber. Those of skill in the art will appreciate that the invention may be embodied in various network topologies, examples of which are ring and mesh topologies. Examples of activities which processing at a node may comprise include routing and add/drop multiplexing. A node may process one or more wavelengths in the optical domain. For example, a node may comprise optical elements, such as optical filters, that pass through wavelengths that are not added or dropped at the node. A node may also perform optical-to-electrical and electrical-to-optical conversions as part of the processing of wavelengths. For example, when dropping a wavelength from the network to a tributary node, optical-to-electrical conversion may be necessary because of only electrical equipment being on the other side or as part of wavelength conversion to a wavelength that can be processed by the tributary node.

Figure 1:
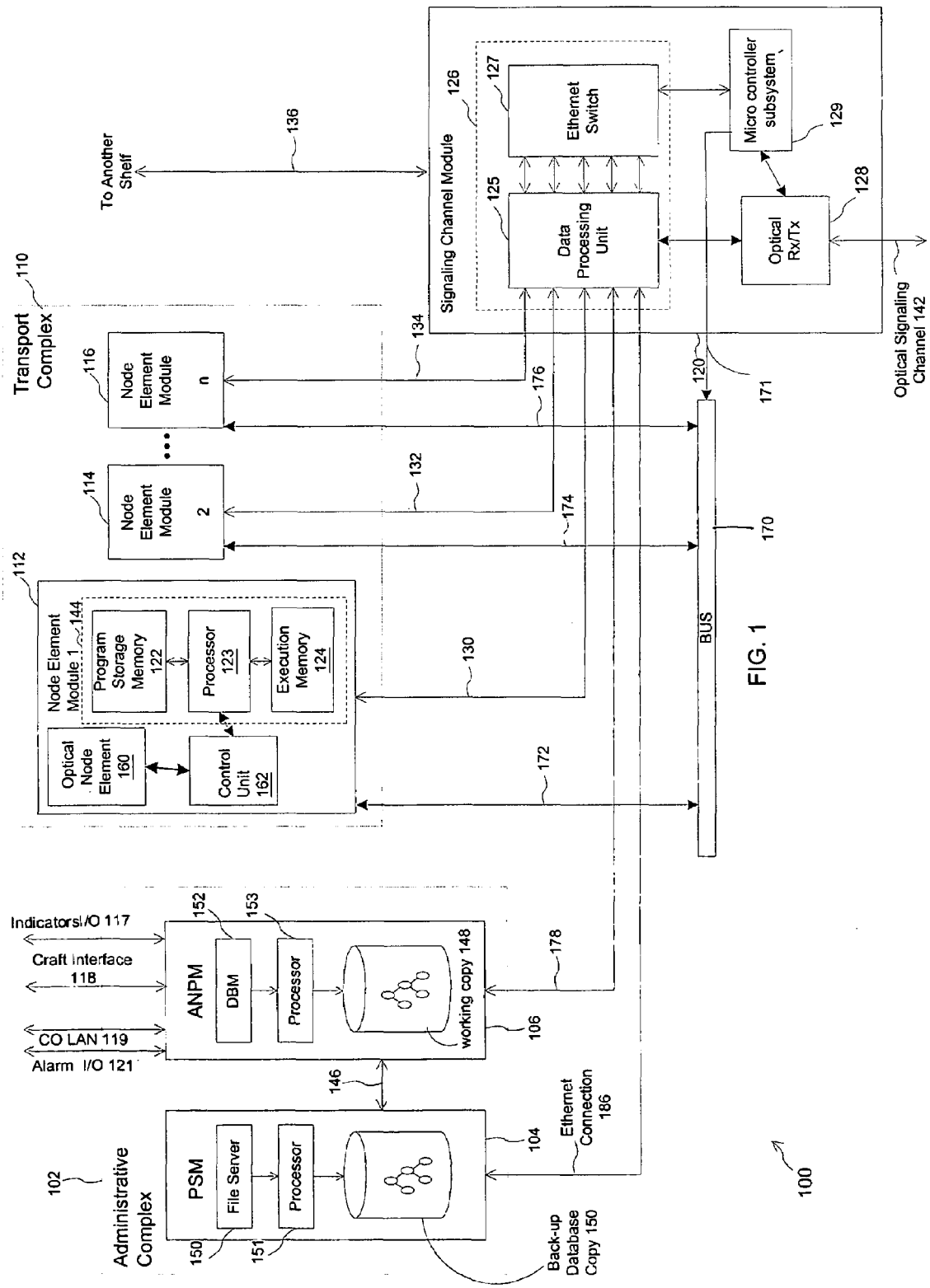
FIG. 1 illustrates an embodiment of a node in an optical communication network comprising an administrative complex and a transport complex.

FIG. 1 shows an embodiment of a node in an optical communication network. FIG. 1 illustrates an embodiment of a node as a data and telecommunications transport platform. In this particular embodiment, the node comprises an administrative complex 102, a transport complex 110 and a signaling channel module 120.

The transport complex 110 includes node element modules 112, 114, 116. The transport complex is the collection of node elements in the system that carries the optical communications traffic. In other words, these are the modules that process the "payload" data of the product. For a transport complex in a node providing optical processing, the node elements may comprise optical filters, switches, amplifiers, and attenuators. The transport complex may also comprise one or more receivers or transmitters for access to the communication system for tributary signals.

Node element module 112 includes one or more optical node elements 160 and including a control unit 162 including electrical hardware and software for controlling one or more of the node elements. In this embodiment, the node element modules share a common electronics architecture. This architecture comprises a microcontroller subsystem 144, which includes a processor 123, program storage memory 122, execution memory 124, an Ethernet connection 130, and a communication link 172 to an intra-nodal bus 170. In one embodiment, the intra-nodal bus is a High-level Data Link Control (HDLC) bus. The microcontroller subsystem 144 may be augmented with additional I/O and control capabilities, as appropriate. A node element module may be embodied as a circuit pack.

In many systems today, node elements are located on circuit packs, a certain number of which exist in a shelf unit. There may be one or more shelf units that comprise the hardware of the node. The number and arrangement of circuit packs in a shelf unit require planning to provide for, among other things, all necessary connections, heat dissipation, and power consumption. The circuit packs may be communicatively coupled to one another through a backplane.

The administrative complex 102 is primarily concerned with management of the node and system related management functions. The administrative complex typically has no payload traffic-affecting elements. The administrative complex performs administrative node functions. Examples of administrative node functions are node configuration, provisioning, providing a management interface to the customer, retrieving and indicating failure conditions through alarms. In other words, the administrative complex performs functions related to the operation, administration, maintenance, and provisioning (OAM&P) of the node. Another administrative function is interaction with external customer management systems to transmit the system's status and accept configuration commands. Other functions include reading external event inputs and signaling exception conditions on alarm outputs.

For example, the administrative complex system is responsible for storing the configuration information for the node element modules. Every node element module at its initialization may upload its current configuration from the administrative complex. Examples of administrative information provided by the node element modules to the administrative complex are events such as state-changes. The administrative complex accepts these events, and updates its own configuration.

The administrative complex shown comprises two units: an administrative node processor module 106 comprising a working copy database 148 of administrative information for the node and a persistent storage module 104 comprising a back-up copy 150 of the database stored in non-volatile memory.

A communication link 146 exists between the administrative node processor module and the persistent storage module for transfers of data. In this embodiment, the databases 148, 150 are object oriented databases. The state of the node may be represented as a run-time container of managed object instances. Changes to node operation are a result of the manipulation of the attributes of the managed objects. The working copy of the administrative node processor module is used during normal operations, and the backup copy is maintained on the PSM. The backup copy is synchronized with the working copy at all times and accessed in case the primary run-time database becomes corrupted or is deleted. For example if the administrative node processor module is replaced, the backup database on the persistent storage module is copied onto the new administrative node processor module when it is installed.

In the embodiment of FIG. 1, both the administrative node processor module and the persistent storage module comprise a processor, 151, 153, execution memory (not shown), for example, dynamic random access memory (DRAM) memory, program storage memory from which an operating system, for example Embedded NT, is downloaded. The processor of the processor module accesses the working copy of the database and interacts with the persistent storage module through the instructions of a database manager application 152 stored in program memory. The persistent storage module processor executes a memory access application 150, such as a file server, to control access to the back-up database 150.

The example of the administrative node processor module shown has additional features. For example, it has an input/output interface 119, for example an Ethernet interface, for communication to a central office local area network (CO LAN), and a Craft Interface 118 such as a serial interface for a Craft RS-232C, or a Modem RS-232C. The administrative node processor module also comprises an alarm input/output external interface 121 and another input/output interface 117 for other indicators.

The processor module 106 also has an intra-nodal communication link 178, in this example an Ethernet connection, to the signaling channel module 120. The persistent storage module 104 also has an intra-nodal communication link 186, in this example an Ethernet connection, to the signaling channel module 120.

The signaling channel module 120 also comprises the central connection point for intra-node communication between node element modules, the administrative node processor module and the persistent storage module. Additionally, the signaling channel module controls the transfer of information, including administrative information at this node, between the illustrated node and other nodes of the network over an optical signaling channel.

An optical signaling channel may be embodied in several different ways. For example, the channel may be embodied as one or more dedicated wavelengths carrying administrative information wherein the one or more dedicated wavelengths is separate from the payload wavelengths. The signaling channel may be embodied in one or more divisions of a time-division multiplexed signal. In another embodiment, the signaling channel is modulated onto the payload signals.

In the embodiment shown, the signaling channel module 120 comprises a Data Interconnection Unit 126 comprising in this example, an Ethernet Switch 127 and a Data Processing Unit 125, an optical transceiver unit 128 comprising an optical transmitter, an optical receiver and related control logic, and a microcontroller sub-system 129. In this embodiment, the microcontroller sub-system has the same architecture as the microcontroller sub-system 144 for a node element module. The microcontroller sub-system 129 also has a communication link 171 to the intra-nodal bus 170.

For incoming communications from other nodes, the optical receiver unit 128 converts the optical signaling channel into electrical form. The electrical signal is sent to the Data Interconnection Unit 126. The signal will be preprocessed by the data processing unit 125. For example, if the data carried on the optical signaling channel uses asynchronous transfer mode (ATM) packet format as its data transmission protocal, the data processing unit 125 comprises ATM physical circuitry to convert the data stream to Ethernet packets to allow transport by the Ethernet switch 127 to the appropriate node element module based on packet header information. Other data formats or transmission protocols may also be used.

Outgoing data to other nodes is formatted by the data processing unit 125 and routed through the Ethernet Switch 127 to the optical transceiver unit 128 where the data is modulated by a transmitter (e.g. a laser) onto the optical signaling channel.

In the embodiment of FIG. 1, different node element modules communicate over an Ethernet network across a backplane. The Ethernet network forms the basis of the communication system for intra-nodal communication. In this embodiment, the central point for intra-node communication and an interface between communications with other nodes and the intra-node communication system is implemented as the Data Interconnection Unit 126 comprising in this example, the Ethernet Switch 127 and the Data Processing Unit 125

This connection point is implemented as an Ethernet switch, which allows full duplex communications to be routed from one switch port to another. Full-duplex operation allows each port on the switch to simultaneously transmit and receive packets, and the Ethernet switch architecture provides sufficient internal bandwidth to allow independent port-to-port communication to occur simultaneously.

The optical signaling channel travels a path including one or more optical transmission media between the nodes. The optical signaling channel may be embodied in several different ways. In one embodiment, the optical signaling channel is embodied as one or more dedicated wavelengths carrying administrative information wherein the one or more dedicated wavelengths travels on optical fiber coupling the nodes of the network. Each dedicated wavelength is demultiplexed (not shown) and received by the optical receiver of the signaling channel module.

In one example, the signaling channel is a wavelength channel outside of the band of wavelengths on which payload data communications are carried. For example in an optical dense wavelength division multiplexing (DWDM) system in which the payload communications are carried in wavelengths in a typical pass-band of approximately 1530 nm and 1560 nm, the optical signaling channel may be carried on a wavelength of 1510 nm. A wavelength of either 1310 nm or 1480 nm may also be used. In another example, the optical signaling channel may be a dedicated wavelength within the pass-band of the payload wavelengths.

In another embodiment, lower frequencies, for example, microwave frequencies can be superimposed on the optical payload wavelengths by subcarrier multiplexing (SCM) techniques.

Below described are two examples of subcarrier multiplexing techniques which maybe employed to embody the optical signaling channel.

Figure 5A:
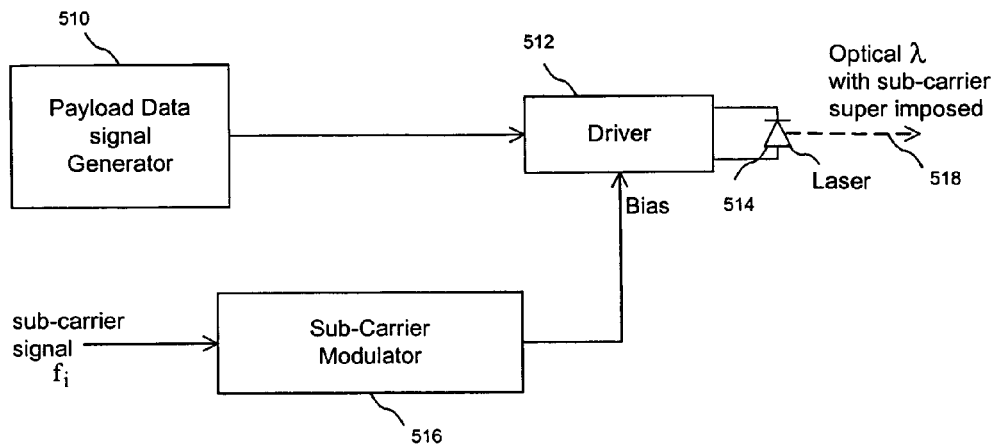
FIG. 5A illustrates an example of a transmitter system for superimposing a sub-carrier signal onto a payload data wavelength.

A sub-carrier frequency, $f_i$, is superimposed onto a payload wavelength $\lambda_i$. FIG. 5A illustrates an example of a transmitter system for injecting a sub-carrier signal $f_i$ onto $\lambda_i$. A sub-carrier modulator (e.g. a frequency shift keying modulator) modulates the administrative data to be carried by the optical signaling channel. For example, the sub-carrier modulator 516 modulates the data at a lowbit rate (e.g. less than 256 kbps) into a sequence of tones. A payload data signal generator 510 generates a signal to drive a driver circuit 512 of a laser 514 so that the wavelength it outputs carries the payload data. As a result, of the modulation of the bias current and the driver current, the output 518 is the payload data wavelength with the sub-carrier superimposed. The transmitter sub-system may be embodied in a node element module that has a transmitter, such as a laser, for generating wavelengths to be added to the network. In this embodiment, the transmitter node element module receives administrative information through the Ethernet Switch 127 from the administrative node processor module.

Figure 5B:
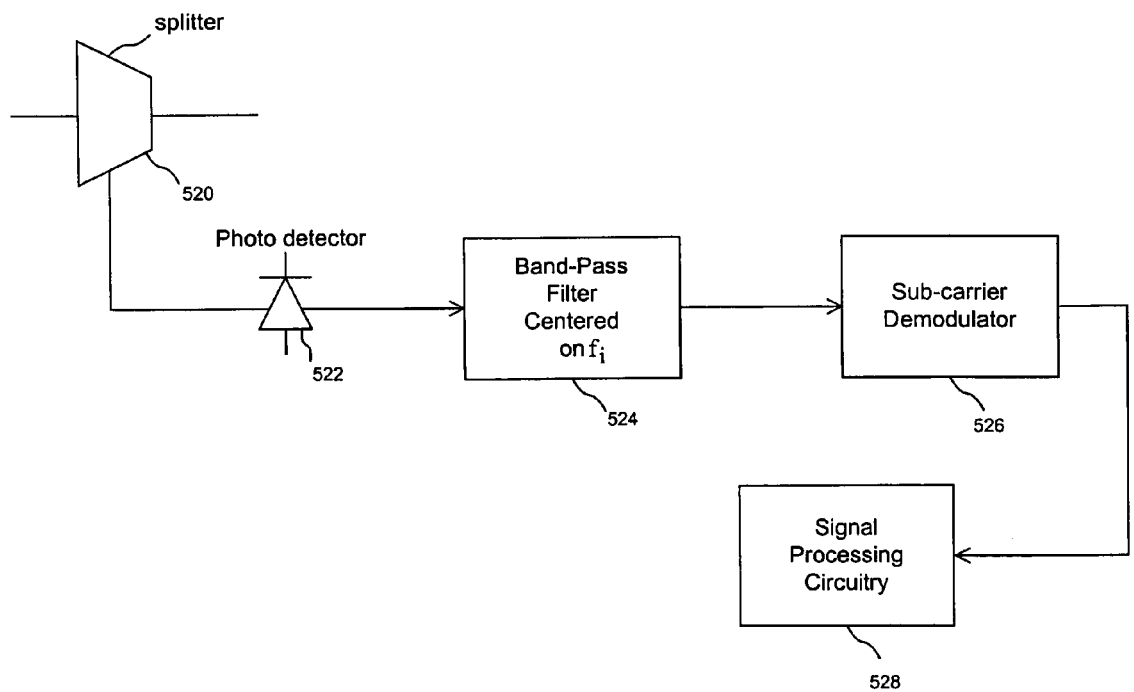
FIG. 5B illustrates an example of a system for receiving and demodulating a sub-carrier multiplexed signal.

FIG. 5B illustrates an example of a system for receiving a sub-carrier multiplexed signal. A fraction of the optical power is split by an optical splitter 520 and detected by a photodetector 522. After optical to electrical conversion, the electrical signal is filtered by a bandpass filter 524 centered about the sub-carrier frequency. The sub-carrier is demodulated by the sub-carrier demodulator 526 to recover the data. It is then passed through signal processing circuitry 528, for example the Data Processing Unit 125 in FIG. 1, to be packetized. The administrative data is forwarded by the node element module that received it to the signaling channel module for transfer to an appropriate node element module. In one embodiment, the receiver system may be located on a node element module that drops a payload wavelength to a tributary. In another embodiment, the receiver system may be located at a position to tap a portion of the incoming light from the fiber before demultiplexing a particular wavelength channel in a WDM system.

Examples of embodiments of sub-carrier modulation are described in Ken-ichi Kitayama, "Subcarrier Multiplexing Based Signaling and Access Control in Optical FDM Networks," GLOBECOM '95: Communications for Global Harmony, November 1995, Vol. 3, pp. 1996–2002, which is hereby incorporated by reference. Another illustration of an embodiment of a signaling channel is described in Hill et al. "*A Transport Network Layer Based on Optical Network Elements,*" J. of Lightwave Tech., Vol. 11, No. 5/6, May/June 1993, pp. 667–679, pp. 674–675 which is hereby incorporated by reference.

The signaling channel may also be embodied in one or more divisions of a time-division multiplexed signal. For example, a bit-stream header may be added to the payload data when the payload data is generated for transmission. At a receiver that performs optical to electrical conversion of the payload data wavelength, the header is removed and its information is forwarded for processing to the signaling channel module.

Figure 2:
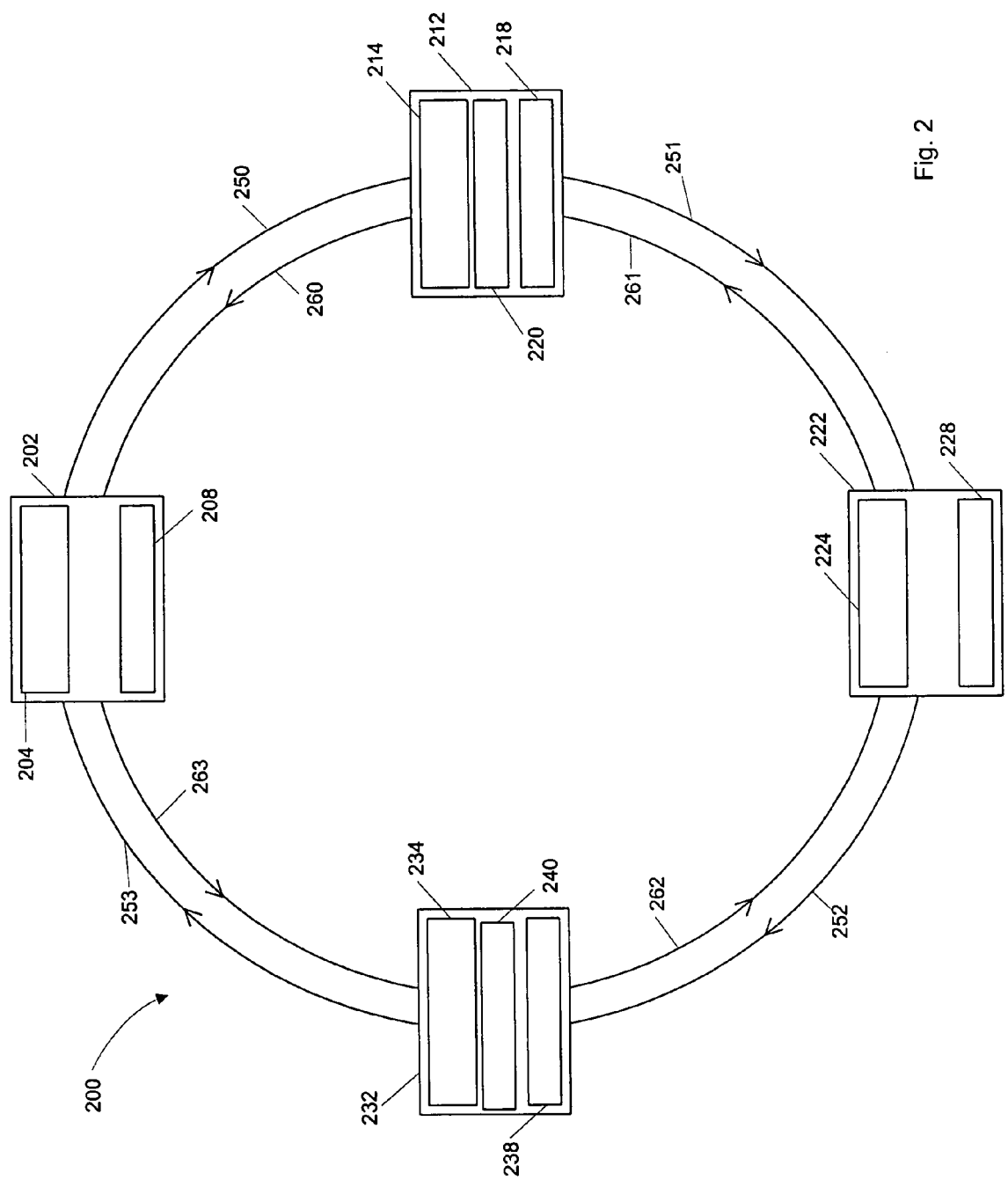
FIG. 2 illustrates an embodiment of an optical communications network having a plurality of nodes in which neighbor nodes share a persistent storage module.

FIG. 2 illustrates an embodiment of an optical communications network having a plurality of nodes 202, 212, 222 and 232, each node being coupled to another node by an optical fiber 250, 260, 251, 261, 252, 262, 253, 263. Each node comprises a signaling channel module 208, 218, 228 and 238 for controlling communication over and processing information carried by the optical signaling channel between the nodes. In this embodiment and in the embodiments illustrated in FIGS. 3 and 4, an optical signaling channel travels on one or more optical fibers between a node and another network node. In the embodiment of FIG. 2, each node comprises a processor module 204, 214, 224, 234. Nodes 212 and 232 each further comprise a persistent storage module 220, 240. In one embodiment, the persistent storage module comprises non-volatile memory.

In the network shown, two neighboring nodes (e.g. 202 and 212) share a persistent storage module for storing a a back-up database copy of administrative information for each of these nodes. In the embodiment shown, nodes 202 and 212 share persistent storage module 220 and nodes 222 and 232 share persistent storage module 240. Alternatively, nodes 202 and 232 share persistent storage module 240 and nodes 212 and 222 share persistent storage module 220. A remote node 202 sharing the persistent storage module uses the optical signaling channel to transfer information to and from persistent storage module 220.

Figure 8:
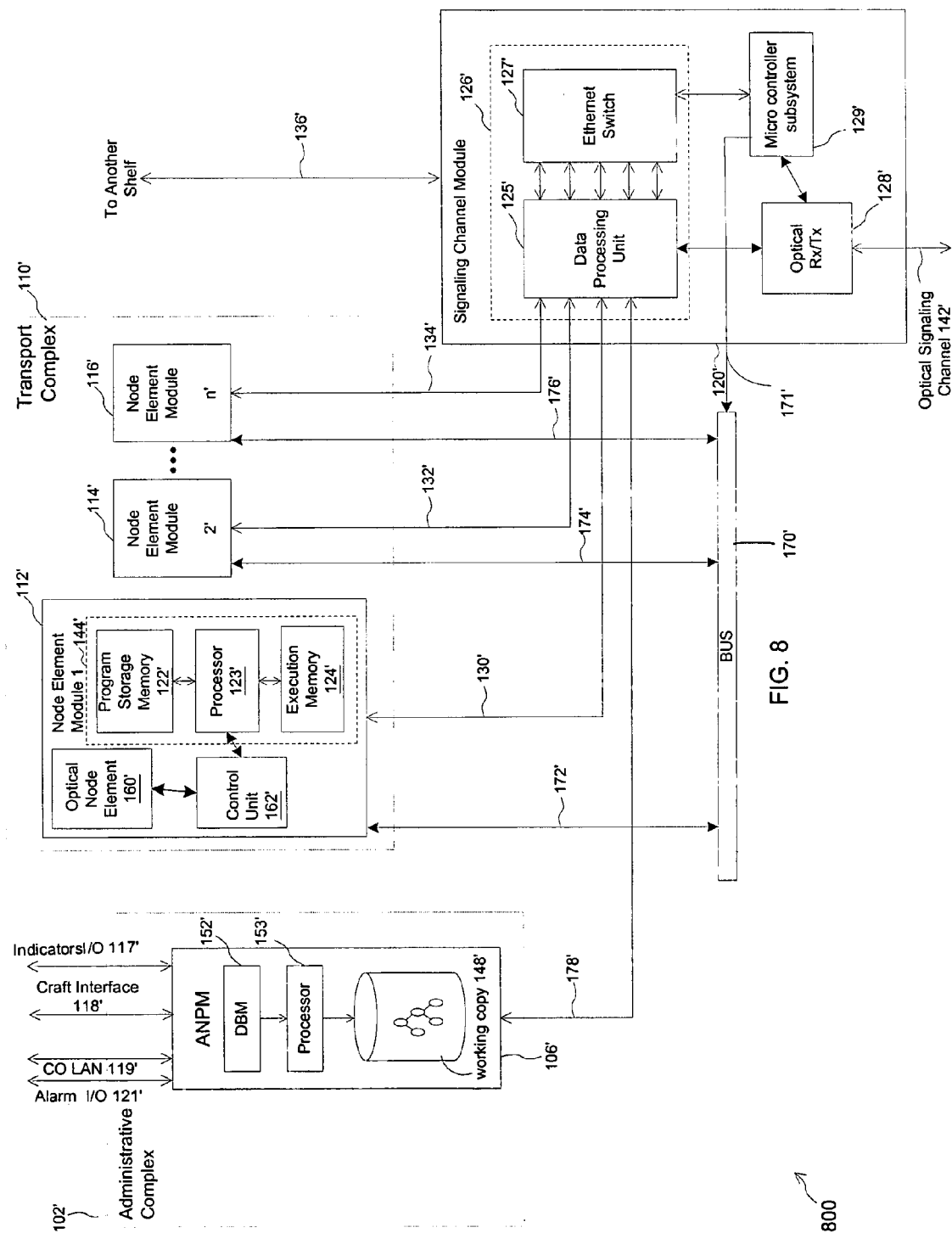
FIG. 8 illustrates an embodiment of a node that persistently stores its administrative information at another network node.

FIG. 8 illustrates an embodiment of a remote node, that is similar to the node illustrated in FIG. 1, except that it does not include a persistent storage module. The remote node sends administrative information for storage in a persistent memory associated with the remote node via the optical signaling channel wherein the associated persistent memory is located within one of the other network nodes. The administrative node processor module in the node having the persistent storage memory (see FIG. 1) associated with the remote node receives the administrative information from the remote node and persistently stores the received administrative information to be backed-up. In this way, a node is able to store administrative information in a distributed manner.

Figure 3:
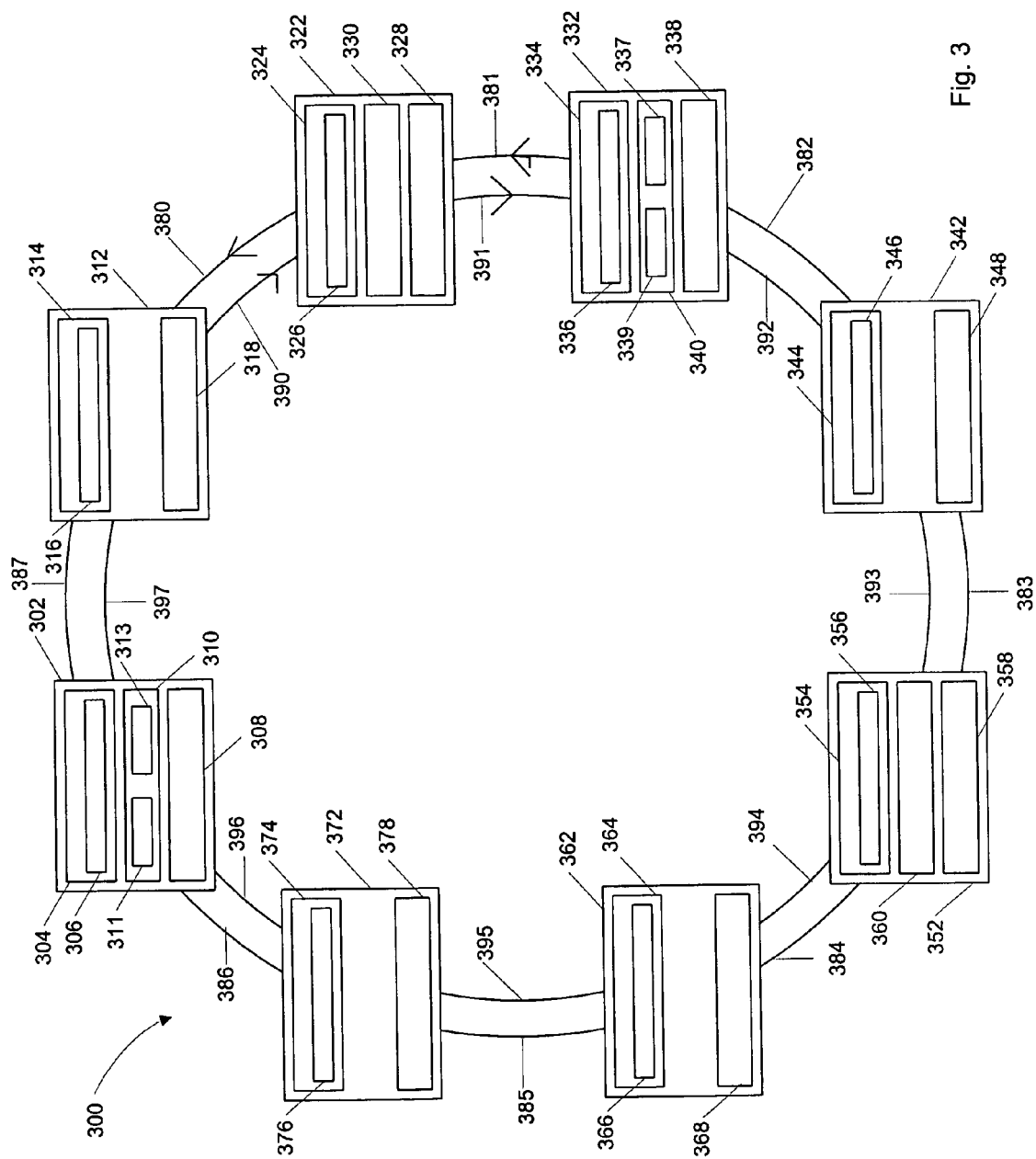
FIG. 3 illustrates an embodiment of an optical communications network having a plurality of nodes in which a different distribution patterns of associated persistent storage memory are illustrated.

FIG. 3 illustrates an embodiment of an optical communications network having a plurality of nodes, in which a remote node's associated persistent storage memory may be distributed in any other node. Each node is communicatively coupled to another node by one or more optical fibers 380, 390, 381, 391, 382, 392, 383, 393, 384, 394, 385, 395, 386, 396, 387, 397 through which optical signals are communicated.

As in the embodiment of FIG. 2, each node comprises a processor module 304, 314, 324, 334, 344, 354, 364, 374. Each processor module comprises a persistent storage memory portion 306, 316, 326, 336, 346, 356, 366 and 376 for storing administrative information data. In one embodiment, this storage memory may be non-volatile memory. In another embodiment, it may be dynamic random access memory (DRAM). Nodes 302, 322, 332, and 352 each further comprise a persistent storage module 310, 330, 340, and 360. A persistent storage module 340, 310 may further comprise memory portions 337, 339, and 311, 313, respectively. One portion 339 may be associated with remote node 312 and the other portion 337 may be associated with remote node 362. In another example, remote node 342 may have as its associated persistent storage memory, portion 339 in the persistent storage module 340 in node 332. The administrative information to be persistently stored in memory portion 339 may travel a relatively short path over the optical fiber 392 between the two nodes. Additionally, a memory portion 311 in the persistent storage module 310 of another node 302 may be associated with the remote node 342. In this case, the path between the nodes includes other nodes as well as optical transmission media.

Figure 4:
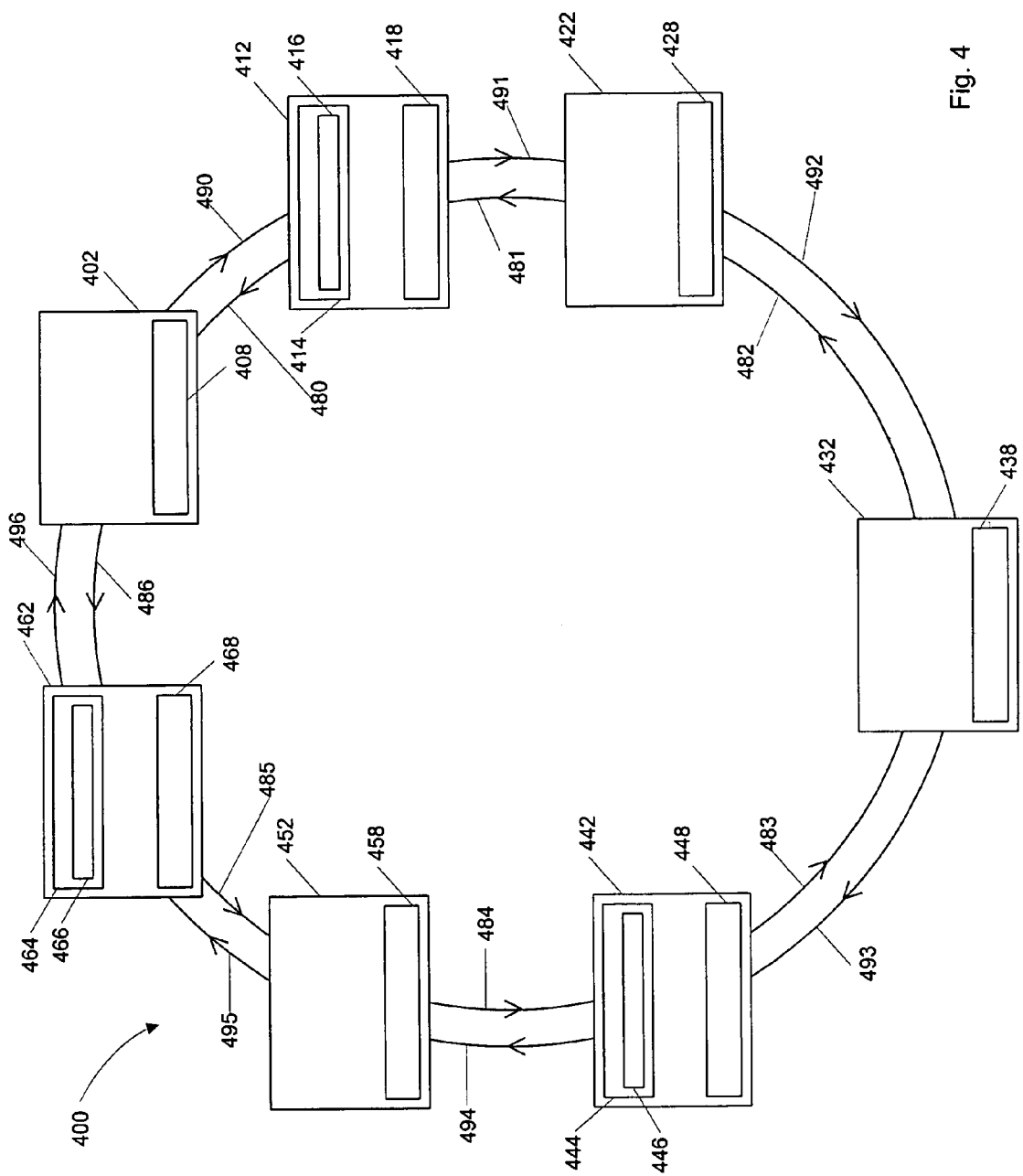
FIG. 4 illustrates an embodiment of an optical communications network having a plurality of nodes in which a node's associated processor node module is located in another network node.

FIG. 4 illustrates another embodiment of an optical communications network having a plurality of nodes, each node being coupled to another node by an optical fiber. This embodiment comprises distributed processor modules throughout the system in different nodes.

The system of FIG. 4 comprises seven nodes 402, 412, 422, 432, 442, 452 and 462, connected together in a bi-directional ring network. In this embodiment, the transmission media between the nodes are optical fibers. As in FIGS. 2 and 3, each node comprises a signaling channel module 408, 418, 428, 438, 448, 458, 468. In this embodiment, the processor modules 414, 444 and 464 are located in some of the nodes 412, 442 and 462, hereafter called processor nodes. The other nodes, hereafter non-processor nodes in this example, do not include an administrative node processor module. While lacking a processor module and persistent storage module, these nodes are not limited as to other modules that they may comprise. Once the associated processor module is found, the processor module can control the administration of the non-processor node.

Figure 9:
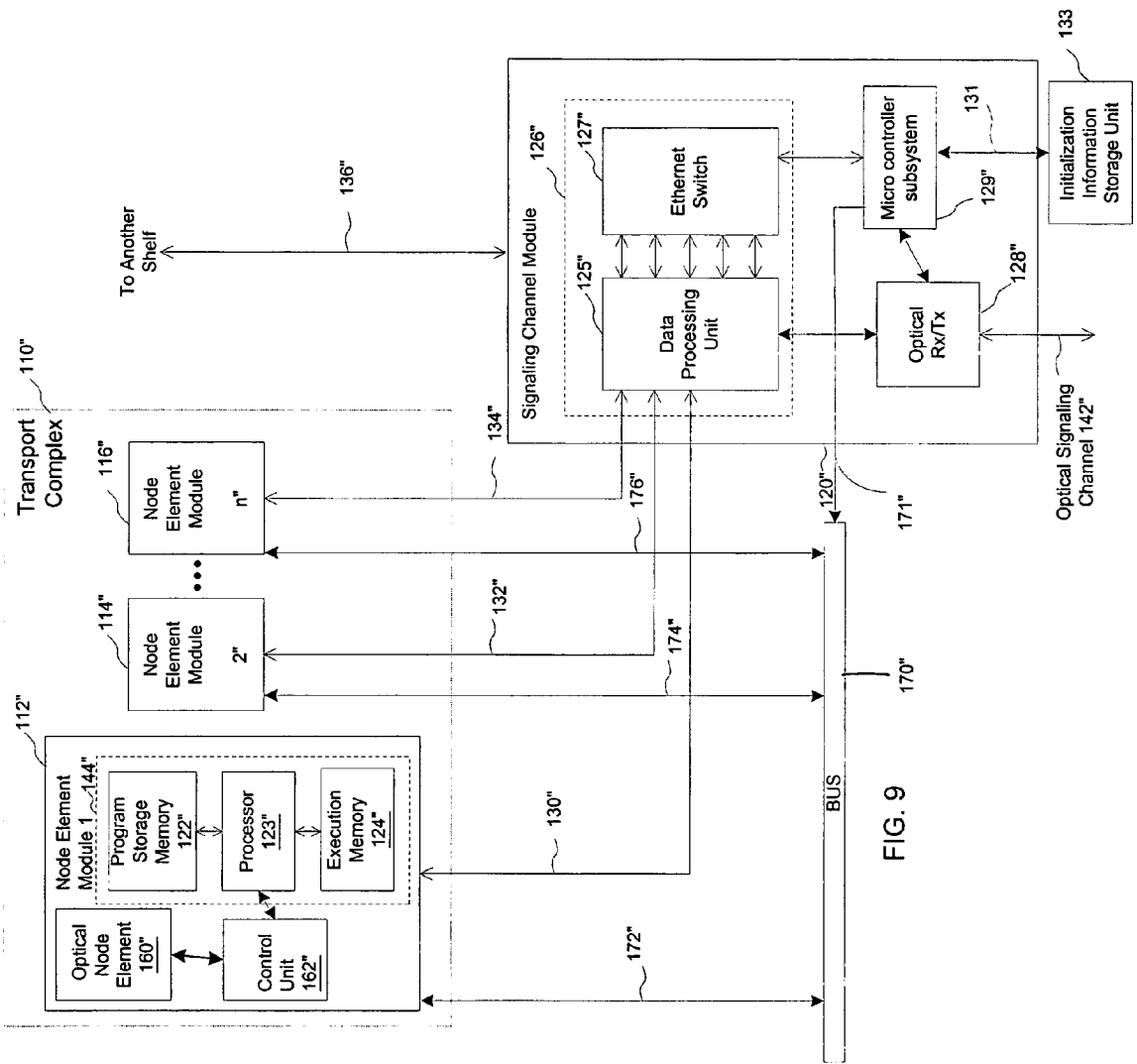
FIG. 9 illustrates an embodiment of a node that is administratively controlled by an administrative node processor module at another network node.

As shown in the illustration of FIG. 9 of an embodiment of a node having an associated administrative processor module at another node, the signaling channel module 120" routes information to and from the node element modules 112", 114", 116" to and from the administrative node processor module at another node by controlling the communication of the administrative information to and from its node to a signaling channel module at the other node. In the embodiment of FIG. 9, the microcontroller sub-system 129" of the signaling channel module 120" has access to an initialization information storage unit 133. In one embodiment, the initialization information storage unit is embodied as an EEPROM. In the initialization process, the microcontroller sub-system 129″ executes instructions of its initialization software to access the initialization information storage unit 133. Examples of initialization information would be shelf identifications that may be used to provision the Internet Protocol (IP) addresses of the node element modules embodied as circuit packs. In this example, the signaling channel module provides initialization information to the other node element modules for their initialization. In one embodiment, the signaling channel module 120″ sends the initialization data over the intra-nodal bus 170″ to the node element modules. Initialization data may also be received by the signaling channel module 120″ from another node via the optical signaling channel. The Ethernet connections 130″, 132″, 134″ may also be used in the initalization process.

Figure 6:
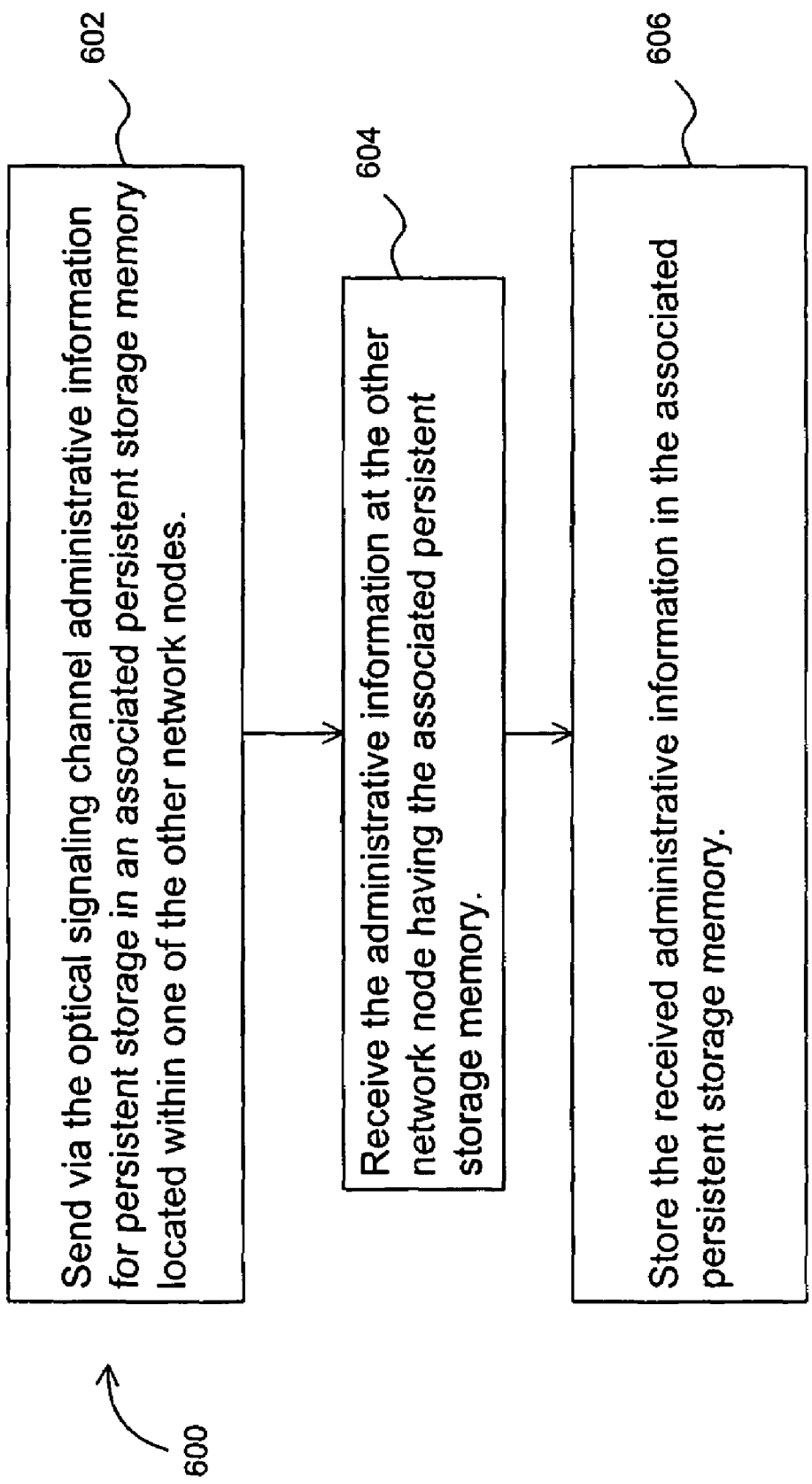
FIG. 6 illustrates an embodiment of a method of communication between nodes for persistence storage of administrative information of one node at another node.

FIG. 6 illustrates an embodiment of a method of communication between nodes for persistence storage of administrative information of one node at another node. A first node that has an associated persistent storage module or an associated persistence storage memory portion at another node sends 602 via the optical signaling channel administrative information for persistent storage in the associated persistent storage module or associated persistent storage memory portion located within one of the other network nodes. The node having the associated module or memory portion receives 604 the administrative information and stores 606 the received administrative information in the associated persistent storage module or associated persistent storage memory portion.

Figure 7:
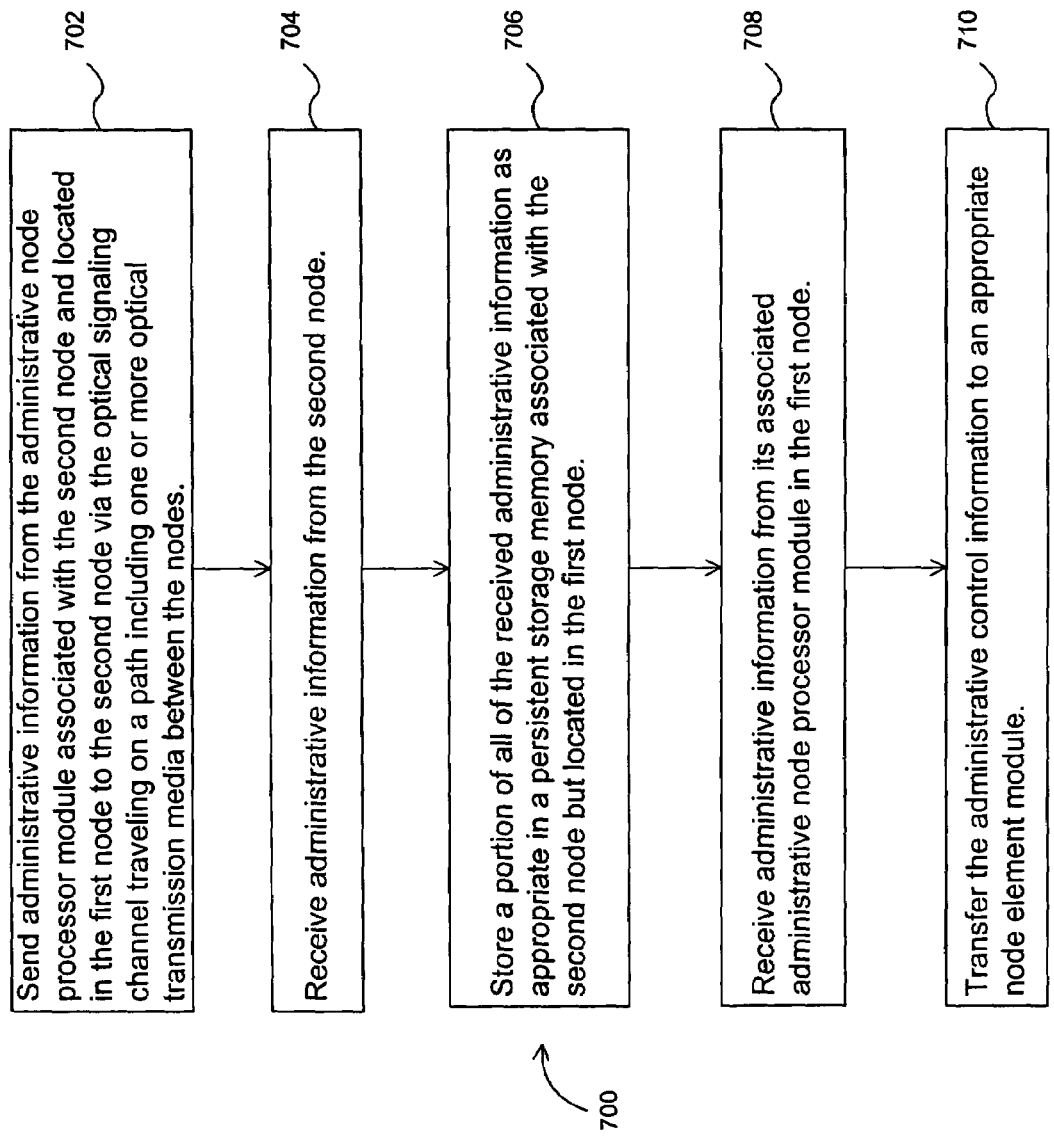
FIG. 7 illustrates an embodiment of an overall method for communicating with an administrative node processor module in another node.

FIG. 7 illustrates an embodiment of an overall method for communicating with an administrative node processor module in another node. A first node having an administrative node processor module that is the associated node processor module of a second node sends 702 administrative information from the administrative node processor module associated with the second node and located in the first node to the second node via the optical signaling channel traveling on the path including one or more optical transmission media between the nodes. The administrative node processor module in the first node receives 704 administrative information from the second node, and stores 706 a portion or all of the received administrative information as appropriate in a persistent storage memory portion or persistent storage module associated with the second node but located in the first node. The signaling channel module in a second node receives 708 administrative information from its associated administrative node processor module in the first node. In this way, the first node administratively controls the second node via administrative information carried on the optical signaling channel. The signaling channel module transfers 710 the administrative control information to an appropriate node element module.

In the network shown in FIG. 2, one or more associated persistent storage modules for a node is distributed at another node. There may be a preset pattern of distribution. For example, a pattern may be preset so that a persistent storage module for a node is found in a neighbor node in a certain direction. Other patterns or random distribution of persistent memory may also be implemented.

Figure 10:
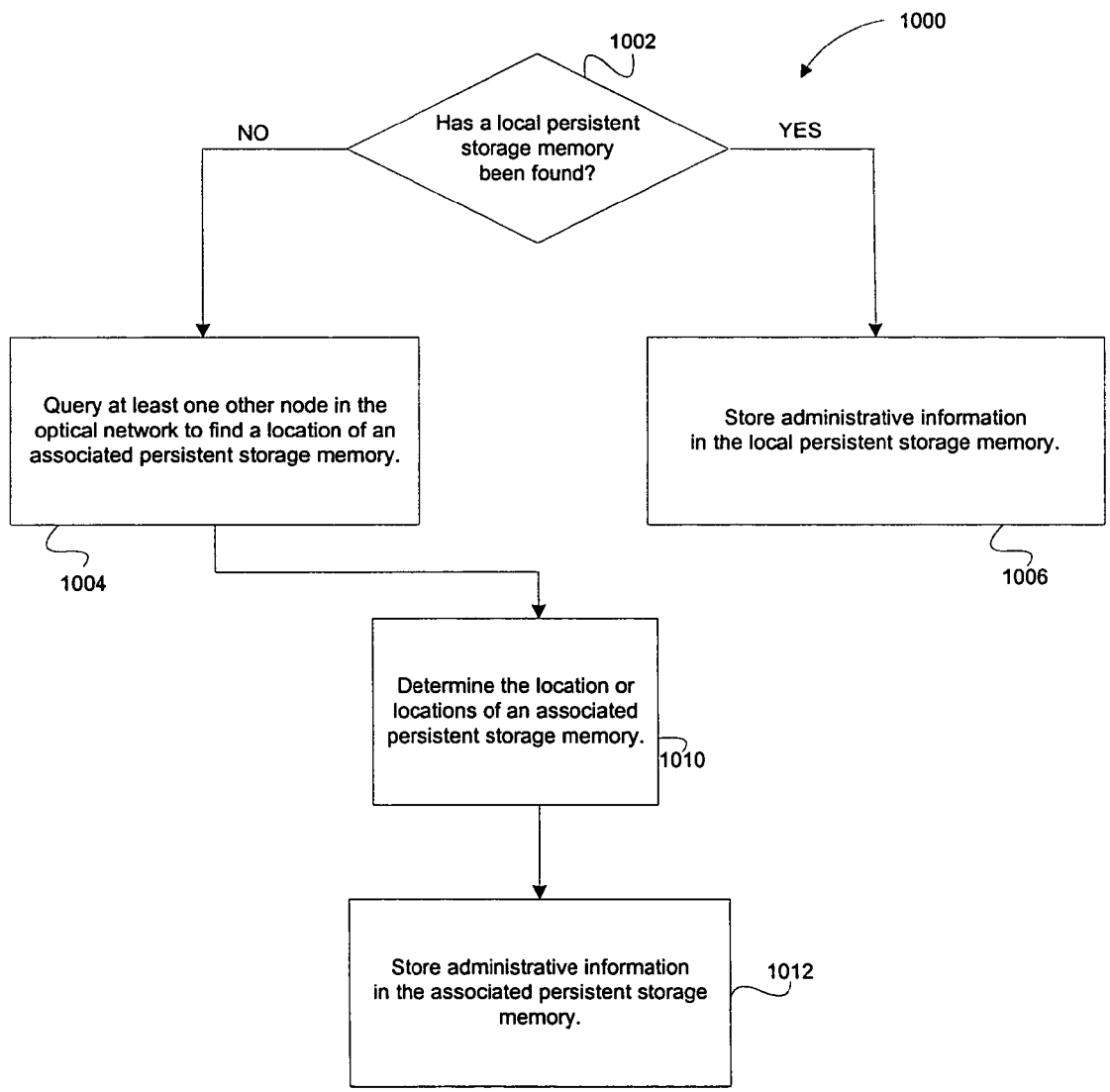
FIG. 10 illustrates an embodiment of an overall method for locating an associated module in another node.

FIG. 10 illustrates an embodiment of an overall method for locating an associated persistent storage memory in another node. The persistent storage memory may be embodied in a persistent storage module or a persistent storage memory portion. Other embodiments are also possible. In this example, the processor module within a node will determine 1002 if local persistent storage memory exists. If it does, then the processor unit will store 1006 its backup copy of administrative data in the local persistent storage memory. If not, then the processor module is a remote node and queries 1004 at least one other node in the network. The node determines 1010 the location or locations of an associated persistent storage memory. One example of performing the query is to send messages to the processor modules or signaling channel modules of one or more other nodes using the optical signaling channel. If the distribution is random or changes over time, a broadcast message may be sent to the other nodes to locate the associated persistent storage memory. If successful, the processor module of the remote node stores 1012 administrative information in the associated persistent storage memory.

From the above description, it will be apparent that the invention disclosed herein provides a novel and advantageous system and method for distributive storage of administrative information and distributed control of administrative information for one node by another. The embodiments of the invention described illustrate how hardware in a node may be reduced and therefore the cost for a system may be reduced. The foregoing discussion discloses and describes examples of methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. An optical communications network having a plurality of nodes comprising:
   a first node including a first administrative node processor module, the first administrative node processor module including a database that stores administrative information used during operation of the first node and a persistent storage module for storing a copy of the administrative information;
   a second node including a second administrative node processor module, the second administrative node processor module including a database that stores administrative information used during operation of the second node for performing administrative functions; and
   an optical signaling channel for carrying a copy of the administrative information from the second node to the first node for storage in the persistent storage module located in the first node, the optical signaling channel traveling on a path including one or more optical transmission media between the nodes.

2. The network of claim 1 wherein each of the first and second nodes further comprises a signaling channel module, each signaling channel module controlling communication of administrative information at its node over the optical signaling channel;
   the signaling channel module of the first node being communicatively coupled to the first administrative node processor module in the first node and to the signaling channel module of the second node; and
   the signaling channel module of the second node being communicatively coupled to the second administrative node processor module of the second node and to the signaling channel module of the first node.

3. The network of claim 1 wherein the first node and the second node are neighbor nodes.

4. The network of claim 1 wherein administrative information comprises configuration information for a node element module.

5. The network of claim 4 wherein the node element module is embodied within a circuit pack.

6. The network of claim 5 wherein the administrative information carried by the optical signaling channel has a data transmission protocol of asynchronous transfer mode.

7. The network of claim 1 wherein the optical signaling channel is carried on a single wavelength that travels on the path between the nodes.

8. The network of claim 7 wherein the wavelength is a wavelength outside of the band of the payload data wavelengths that travel on the path.

9. The network of claim 7 wherein the wavelength is a wavelength inside of the band of the payload data wavelengths that travel on the optical path.

10. The network of claim 1 wherein the optical signaling channel is embodied in one or more divisions of a time-division multiplexed signal carried on one or more wavelengths.

11. The network of claim 1 wherein the optical signaling channel is carried as a sub-carrier frequency superimposed on one or more payload data wavelengths that travel on the path between the nodes.

12. An optical communications network having a plurality of nodes comprising:
   a first node including an administrative node processor module for performing administrative functions, the administrative node processor module having a persistent storage memory portion associated with a second node for storing administrative information of the second node; and
   an optical signaling channel for carrying from the second node to the first node administrative information for storage in the persistent storage memory portion, the optical signaling channel traveling on a path including one or more optical transmission media between the nodes.

13. The network of claim 12 wherein each of the first node and the second node further comprises a signaling channel module, each signaling channel module controlling communication of administrative information at its node over the optical signaling channel;
   the signaling channel module of the first node being communicatively coupled to the administrative node processor module in the first node and to the signaling channel module of the second node; and
   the signaling channel module of the second node being communicatively coupled to the administrative node processor module of the second node and to the signaling channel module of the first node.

14. The network of claim 12 wherein the optical signaling channel is carried on a single wavelength that travels on the path between the nodes.

15. The network of claim 14 wherein the wavelength is a wavelength outside of the band of the payload data wavelengths that travel on the path.

16. The network of claim 14 wherein the wavelength is a wavelength inside of the band of the payload data wavelengths that travel on the path.

17. The network of claim 12 wherein the optical signaling channel is embodied in one or more divisions of a time-division multiplexed signal carried on one or more wavelengths.

18. The network of claim 12 wherein the optical signaling channel is carried as a sub-carrier frequency superimposed on one or more payload data wavelengths that travel on the path between the nodes.

19. An optical communications network having a plurality of nodes comprising:
   a first node including an administrative node processor module for performing administrative functions for the first node and a second node; and
   an optical signaling channel communicatively coupling the nodes for the transfer of administrative information, the optical signaling channel traveling on a path including one or more optical transmission media between the nodes.

20. The network of claim 19 wherein each of the first node and the second node further comprises a signaling channel module for controlling communication of administrative information at its node over the optical signaling channel;
   the signaling channel module of the first node being communicatively coupled to the administrative node processor module and to the signaling channel module of the second node; and
   the signaling channel module of the second node transferring administrative information received from the first node to a node element module.

21. The network of claim 20 wherein the administrative node processor module of the first node comprises a persistent storage memory portion for storing administrative information of the second node received via the optical signaling channel.

22. The network of claim 19 wherein the optical signaling channel is carried on a single wavelength that travels on the optical path between the nodes.

23. The network of claim 22 wherein the wavelength is a wavelength outside of the band of the payload data wavelengths traveling on the path.

24. The network of claim 22 wherein the wavelength is a wavelength inside of the band of the payload data wavelengths traveling on the path.

25. The network of claim 19 wherein the optical signaling channel is embodied in one or more divisions of a time-division multiplexed signal carried on one or more wavelengths.

26. The network of claim 19 wherein the optical signaling channel is carried as a sub-carrier frequency superimposed on one or more payload data wavelengths that travel on the path between the nodes.

27. In an optical network having a plurality of nodes, a method comprising:
   a first node receiving administrative information from a second node;
   the first node storing the received administrative information from the second node in persistent storage memory portion located in the first node;
   the first node performing administrative functions for the second node; and
   the first node sending administrative information to the second node via an optical signaling channel traveling on a path including one or more optical transmission media between the nodes.

28. The method of claim 27 comprising:
   a signaling channel module in the second node receiving administrative information from the first node over the optical signaling channel,
   the signaling channel module controlling communication of administrative information over the optical signaling channel; and
   the signaling channel module transferring the administrative information to a node element module.

29. The method of claim 27 wherein the optical signaling channel is carried on a single wavelength traveling on the path between the nodes.

30. The method of claim 29 wherein the wavelength is a wavelength outside of a band of the payload data wavelengths traveling on the path.

31. The method of claim 29 wherein the wavelength is wavelength inside of a band of the payload data wavelengths traveling on the path.

32. The method of claim 27 wherein the optical signaling channel is embodied in one or more divisions of a time-division multiplexed signal carried on one or more wavelengths.

33. The method of claim 27 wherein the optical signaling channel is carried as a sub-carrier frequency superimposed on one or more payload data wavelengths that travel on the path between the nodes.

34. In an optical communications network having a plurality of nodes, a method comprising:
   a first node sending a query to one or more of the other nodes in the network via an optical signaling channel traveling on one or more paths including one or more optical transmission media between the first node and the other network nodes; and
   the first node determining which of the other network nodes has a persistent storage memory associated with the first node.

35. In an optical network having a plurality of nodes, a method comprising:
   sending administrative information from a first node to another network node for storage in the persistent storage memory in the other network node;
   controlling the communication of the administrative information over an optical signaling channel traveling on a path including one or more optical transmission media between the first node and the other network node;
   receiving the administrative information from the first node at the other network node; and
   storing the administrative information from the first node in the persistent storage memory in the other network node.

36. The method of claim 35 wherein the optical signaling channel is carried on a wavelength that travels on the path between the nodes.

37. The method of claim 36 wherein the wavelength is a wavelength outside of a band of the payload data wavelengths that travel on the path.

38. The method of claim 36 wherein the wavelength is a wavelength inside of a band of the payload data wavelengths that travel on the path.

39. The method of claim 36 wherein the optical signaling channel is embodied in one or more divisions of a time-division multiplexed signal carried on the wavelength.

40. The method of claim 35 wherein the optical signaling channel is carried as a sub-carrier frequency superimposed on one or more payload data wavelengths that travel on the path.

41. An optical network having a plurality of nodes comprising:
   means for receiving administrative information by a first node from a second node;
   means for storing the received administrative information form the second node in a persistent storage memory located in the first node;
   means for performing administrative functions for the second node by the first node; and
   means for sending administrative information from the first node to the second node via internodal communication means.

42. An optical network having a plurality of nodes comprising:
   means for sending a query from a first node to one or more of the other nodes in the network via internodal communication means between the first node and the other network nodes; and
   means for determining by the first node which of the other network nodes has a persistent storage memory associated with the first node.

43. An optical network having a plurality of nodes comprising:
   means for sending administrative information from a first node to another network node for storage in a persistent storage memory in the other network node;
   means for controlling the communication of the administrative information via internodal communication means between the first node and the other network node;
   means for receiving the administrative information from the first node; and
   means for storing the administrative information from the first node in the persistent storage memory in the other network node.

* * * * *